United States Patent
Shimamura et al.

[11] Patent Number: 6,090,505
[45] Date of Patent: Jul. 18, 2000

[54] NEGATIVE ELECTRODE MATERIALS FOR NON-AQUEOUS ELECTROLYTE SECONDARY BATTERIES AND SAID BATTERIES EMPLOYING THE SAME MATERIALS

[75] Inventors: Harunari Shimamura; Kazuhiro Okamura; Yoshiaki Nitta, all of Hirakata, Japan

[73] Assignee: Matsushita Electric Industrial Co., Ltd., Osaka, Japan

[21] Appl. No.: 09/090,484

[22] Filed: Jun. 3, 1998

[30] Foreign Application Priority Data

Jun. 3, 1997 [JP] Japan ..................................... 9-144873
May 6, 1998 [JP] Japan .................................. 10-123199

[51] Int. Cl.$^7$ ................................................. H01M 04/58
[52] U.S. Cl. ................................... 429/218.1; 429/231.9; 429/231.95; 429/209
[58] Field of Search ................................ 429/209, 218.1, 429/223, 226, 231.1, 231.6, 231.8, 231.9, 231.95

[56] References Cited

U.S. PATENT DOCUMENTS

| | | | |
|---|---|---|---|
| 4,489,143 | 12/1984 | Gilbert et al. ........................... | 429/103 |
| 4,495,358 | 1/1985 | LeMéhauté et al. . | |
| 4,632,889 | 12/1986 | McManis et al. . | |
| 4,950,566 | 8/1990 | Huggins et al. . | |
| 5,395,711 | 3/1995 | Tahara et al. ............................ | 429/197 |
| 5,587,256 | 12/1996 | Wilson et al. ............................ | 429/218 |
| 5,624,606 | 4/1997 | Wilson et al. ............................ | 252/506 |
| 5,770,333 | 6/1998 | Saito et al. ............................... | 429/194 |
| 5,827,331 | 10/1998 | Block et al. ............................. | 29/623.5 |
| 5,900,335 | 5/1999 | Nishimura et al. .................. | 429/231.4 |

FOREIGN PATENT DOCUMENTS

| | | |
|---|---|---|
| 0 693 568 A1 | 7/1994 | European Pat. Off. . |
| 7-315822 | 12/1995 | Japan . |
| 9-63651 | 3/1997 | Japan . |

*Primary Examiner*—Stephen Kalafut
*Assistant Examiner*—Raymond Alejandro
*Attorney, Agent, or Firm*—Rarner & Prestia

[57] ABSTRACT

A material of the negative electrode for the non-aqueous electrolyte secondary battery comprises solid phases A and B. A core is formed by the solid phase A of which lithium absorption and desorption amount resulted from charge and discharge is relatively large. The core is partially or entirely wrapped with the solid phase B of which lithium absorption and disorption amount resulted from charge and discharge is not so much as the solid phase A, however, of which discharge capacity decrease a little resulted from cycles. The solid phase A comprises one of the following materials; lithium, at least one of the elements which is able to alloy with lithium, solid solution including at least one of the above elements being able to alloy with lithium, or an intermetallic compound including at least one of the above elements being able to alloy with lithium. The solid phase B has a different composition, but comprises the same kind of materials except lithium by itself as those of the solid phase A. It is essential that the solid phase B is a mixed conductor having electronic conductivity as well as lithium ionic conductivity. When these materials are used in the negative electrode, the non-aqueous electrolyte second battery featuring a high reliability in the safety aspect, high cycle characteristic, a high capacity and excellent high-rate charge and discharge characteristic can be realized.

39 Claims, 1 Drawing Sheet

NEGATIVE ELECTRODE MATERIALS FOR NON-AQUEOUS ELECTROLYTE SECONDARY BATTERIES AND SAID BATTERIES EMPLOYING THE SAME MATERIALS

BACKGROUND OF THE INVENTION

1. Field of the Invention

The present invention relates to non-aqueous electrolyte secondary batteries employing organic electrolyte, solid polymer electrolyte or the like, and more particularly to negative electrode materials thereof featuring a high capacity, high reliability for the safety aspect, a little decrease of discharge capacity resulting from cycles, and excellent high-rate charge and discharge characteristics.

2. Description of the Prior Art

A lithium battery employing lithium as negative active material, in general, generates high electromotive force and can be high energy density. The lithium batteries thus employ various positive active materials combined with the negative active material, and are commercialized to be battery systems, thereby reducing dimensions as well as weights of cordless and portable products.

A lot of effort made both for R&D and commercializing of the lithium batteries is not only for the primary battery, i.e., the battery should be replaced after discharging, but also for the secondary battery, i.e., the battery can be repeatedly used by recharging.

Lithium reacts with water excitedly, and produces hydrogen. Thus, the electrolyte of the lithium batteries employs non-aqueous electrolyte, e.g., 1) organic electrolyte made of dehydrated aprotic organic solvent dissolving lithium salt, and 2) solid polymer electrolyte. The lithium batteries are thus sometimes called non-aqueous electrolyte primary battery and non-aqueous electrolyte secondary battery.

As a positive active material of the non-aqueous electrolyte secondary battery, transition metal element oxides including vanadium pentoxide ($V_2O_5$), titanium disulfide ($TiS_2$), molybdenum disulfide ($MoS_2$) and chalcogenide were examined at first; however, recently, lithium contained transition metal element oxides of which transition metal element is partially replaced with another element have been examined. The oxides of lithium contained transition metal element such as $LiCoO_2$, $LiNiO_2$, $LiMn_2O_4$ which are double oxides of lithium and cobalt, lithium and nickel, and lithium and manganese. These double oxides repeat desorption and absorption of lithium ion by charge and discharge, whereby excellent cycle life characteristics can be obtained. The chalcogenide, one of the lithium contained transition metal element, is also examined besides these double oxides.

On the other hand, regarding the negative electrode materials, metal lithium which is active material could be the most desirable material from the standpoint of energy density provided it can be used as it is, because an electric potential would be least-noble. However, when this secondary battery is charged, active dendrite or mossy crystal having a large specific surface area deposits on the negative electrode surface, and the crystals thereof react with the solvent in the electrolyte, whereby being deactivated with ease, which lowers the capacity of the battery rapidly, and therefore, a larger quantity of metal lithium must be pre-filled in the negative electrode. Further, the deposited dendrite might penetrate the separator and cause an internal short circuit. These problems shorten the cycle life and affect the product safety.

In order to prevent the dendrite from occurring when the battery is charged, the following materials were tested as a negative electrode material: Li—Al alloy, alloy of Li and Wood's metal which is fusible alloy. When one of these metals which can be alloyed with lithium or such an alloy which contains at least one of these metals is employed as a negative electrode material, the battery indicates a relatively higher capacity at an initial charge and discharge cycle.

However, alloying with lithium and lithium elimination are repeated due to charge and discharge, and thus, a phase of the crystal is sometimes changed although a crystal structure of an original skeletal alloy is still maintained, or the crystal structure per se may be changed into a different one from the original skeletal alloy. In such a case, particles of the metal or the alloy, i.e., a host material of lithium which is an active material repeats swelling and shrinking. Along with the progress of charge and discharge cycles, a crystal particle of the metal or the alloy gets cracks, and the particle's fineness progresses finer and finer. Due to this phenomenon, an ohmic resistance between the negative electrode materials increases, and a resistance polarization grows during charge and discharge. As a result, these materials were proved not to satisfy a cycle life characteristic necessary for a practical use.

In recent years, a carbon material such as graphite is employed as a host material of the negative electrode, because such a carbon material is able to absorb and desorb lithium ion by charge and discharge. The carbon material as a negative electrode material, the lithium contained cobalt oxide as a positive electrode material and organic electrolyte are combined to make a system called lithium-ion secondary battery, which is now available in the market.

Further, in order to increase a negative electrode capacity, it is proposed in Japanese Patent Application Laid Open No. H07-315822 that a compound of a host material comprising graphitized carbon material and a material, e.g., silicon mixed product incorporated with the host material be employed as a negative electrode material. This laid open application teaches that the battery employing the proposed material has the higher capacity and the longer cycle life than those of the battery which employs silicon alone as a host material of he negative electrode. However, it seems that there is a poor chemical bonding force between silicon and carbon, whereby dimensional swelling of silicon due to absorbing lithium therein cannot be suppressed completely by the carbon around the silicon. As a result, a satisfactory cycle life is not realized.

Other materials are also proposed in the Japanese Patent Application Laid Open Nos. below in order to achieve a high capacity and a long cycle life:

H05-159780: Iron silicide, e.g., $Fe_2Si_3$, $FeSi$, $FeSi_2$

H07-240201: transition element and nonferrous metal silicide,

H09-63651: a host material comprising an intermetallic compound including at least one of 4B element, P or Sb and having one of a crystal structure of $CaF_2$ type, ZnS type or AlLiSi type.

The above materials absorb lithium into crystal lattice thereof by charging, and desorb lithium by discharging. Repeated charge and discharge neither swells nor shrinks the skeletal crystal extensively, and fineness of the crystal particles progresses little. An excellent cycle characteristic thus can be expected.

And yet, the lithium quantity absorbed and desorbed into/from the crystal lattice is limited, those materials thus can not meet the request of the higher capacity, which still remains a problem.

A non-aqueous electrolyte secondary battery as a power supply of an apparatus is required the following features: 1. High capacity, 2. Long cycle life, 3. Chargeable/dischargeable with a high rate. In other words, if a negative electrode material has an extraordinary high capacity but has poor charge and discharge characteristics, it is impossible to reduce both size and weight of the power supply for some applications.

In the non-aqueous electrolyte secondary battery, an electrochemical activity of the particle surface of the negative electrode material is a key factor for improving the charge and discharge characteristics. For instance, in the negative electrode material comprising silicon as a host material, silicon has an advantage such as absorbing and desorbing a lot of lithium during charge-transfer reaction under high-rate charge and discharge. On the other hand, when one of suicides described previously is employed as the negative electrode material, an excellent cycle characteristic can be expected because of superior oxidation and reduction reaction during the charge and discharge according to the function of a mixed conductor for electrons and lithium ions. However, this material has an inferior characteristic of high-rate charge and discharge due to relatively smaller power of absorbing and desorbing lithium.

SUMMARY OF THE INVENTION

The present invention aims to provide a negative electrode material for a non-aqueous electrolyte secondary battery, the material features high reliability from the safety view of point, high capacity, less decreasing of discharge capacity due to cycles, and excellent high-rate charge and discharge characteristics.

The present invention covers a composite particle comprises the following elements:
(a) a core formed by solid phase A, and
(b) solid phase B wrapping the core entirely or partially.

The solid phase A comprises one of the following elements:
(a-1) lithium,
(a-2) at least one element which is able to alloy with lithium,
(a-3) solid solution including an element which is able to alloy with lithium, or
(a-4) intermetallic compound including an element which is able to alloy with lithium.

The solid phase B has a different composition from the solid phase A, and comprises one of the following elements (b-1) or (b-2):
(b-1) solid solution including (b-3)
(b-2) intermetallic compound including (b-3)
(b-3) at least one element which can alloy with lithium.

The composite particle combining the solid phases A and B is employed as the negative electrode material of the non-aqueous electrolyte secondary battery, thereby realizing the battery which meets the requests such as ensuring, a) safety reliability, b) higher capacity, c) less decreasing of discharge capacity due to cycles, and d) excellent high-rate charge and discharge characteristics.

To be more specific, the negative electrode material according to the present invention is realized by the following elements: The composite particle comprises the solid phase A and solid phase B, where the solid phase A is formed by at least one of the elements below, or either solid solution or an intermetallic compound, each of them including at least one of the elements below:

zinc, cadmium, aluminum, gallium, indium, thallium, silicon, germanium, tin, lead, antimony and bismuth,
all of these elements being able to alloy with lithium,
and where the solid phase B is formed by solid solution or intermetallic compound, either one including at least one element selected from alkaline-earth metal elements and transition metal elements.

DETAILED DESCRIPTION OF THE PREFERRED EMBODIMENTS

Exemplary embodiments of the present invention are detailed by referring to the attached drawings and tables.
[Embodiment 1]
(1) Preparing powder for the negative electrode material First, 1) prepare metal lithium and granular element being able to alloy with lithium at a predetermined ratio in an alumina crucible, second, 2) heat the above sample up to an appropriate melting temperature in an electric furnace under dry argon atmosphere, and keep the temperature for one hour, then 3) cool the melted sample down to the room temperature, finally 4) crush the solidified ingot into powder of which each particle size is not more than 150 $\mu$m.

(2) Analyzing the section of the prepared powder

First, 1) put the prepared powder into epoxy resin to which curing agent is added, second, 2) knead this sample to disperse the powder, then, 3) de-air substantially and cure the sample, and 4) wrap the sample with epoxy resin, after that, 5) slice the epoxy block in which the prepared powder disperses with a saw in a glove box under dry argon atmosphere, then, 6) polish the section of the sliced block, finally, 7) analyze the polished section with an electronic probe micro analysis (EPMA) method by using JXA-8600MX manufactured by Japan Electronic Co., Ltd.

(3) Measuring an electronic conductivity of the sample powder

Put 3.0 g sample powder into a plastic cylinder whose inner diameter is 25 mm. Apply pressure of 408 kg f·cm$^{-2}$ to the sample powder. The plastic cylinder has metallic dies fit into both ends of the cylinder. Insert a metal rod into the cylinder, and measure an ohmic resistance value between the metal dies, (the sample powder is sandwiched between the metal dies,) with LORESTA-SP (MCP-T500) made by Mitsubishi Chemical Co., Ltd., and then find the electronic conductivity from the ohmic resistance.

(4) Measuring an ionic conductivity of the sample powder

Put 3.0 g sample powder into a plastic cylinder of which inner diameter is 10 mm, and apply pressure of 2546 kg·cm$^{-2}$ to the powder to mold pellets. The pellet is covered on its both end faces by glassy solid electrolyte, of which thickness is ca. 1.0 mm, and expressed as 0.01 Li$_3$PO$_4$+0.63 Li$_2$S+0.36 SiS$_2$. The glossy solid electrolyte has lithium ionic conductivity. Further, cover the outside of the pellet with metal lithium of approx. 1 mm thickness. Then apply pressure of 5093 kgf·cm$^{-2}$ to both faces of the pellet, and measure resistance value with an AC impedance measuring device made by Solartron Co., Ltd. in the U.K., finally find the lithium ionic conductivity from the measured resistance value.

Figure 1:
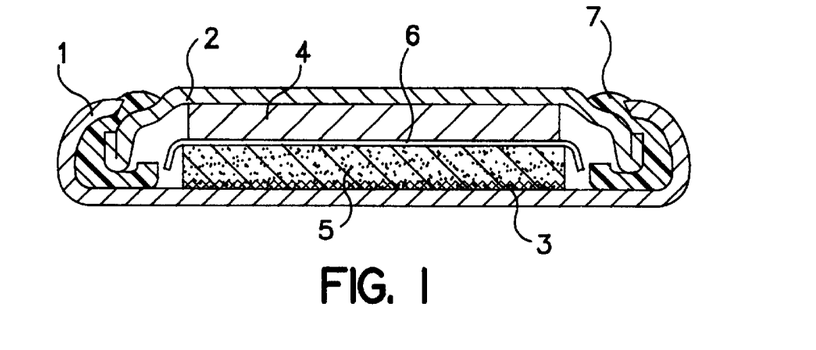
FIG. 1 is a vertical cross sectional view of a coin type test cell for evaluating charge and discharge efficiency and electrochemical characteristics of negative electrode materials of the present invention.

(5) Evaluating a charge and discharge characteristics of the negative electrode material Produce a coin type test cell specified as R2016 size (Ø 20.0 mm, 1.6 mm overall height) as illustrated in FIG. 1, then measure electrochemical characteristics including charge and discharge capacity, etc. of the negative electrode material for evaluation.

In FIG. 1, a cell case 1 and a cover 2 both made of stainless steel are sealed gas-tightly and liquid-tightly via a gasket 7 made from polypropylene. A negative material mold electrode 5 is molded with a current collector 3 into one body, meanwhile, the current collector 3 is made of stainless steel expanded metal and welded to an inner bottom face of the cell case 1. A disk-type metal lithium electrode 4 is press fit to an inner face of the cover 2. The negative material mold electrode 5 is separated from the metal lithium electrode 4 by a separator 6 made of microporous polypropylene membrane. Organic electrolyte impregnates between the electrodes and into the negative material mold electrode 5 as well as the separator 6.

The negative material mold electrode 5 is made of pre-determined quantity of a mix which is molded with the current collector 3 into one body. The mix comprises (a) negative material powder 85%, (b) binder 10% made of polyvinylidene fluoride and (c) conductive agent 5% made of acetylene black. These percentages represent the relative weight ratios among the materials. After the negative material mold electrode 5 in the cell case 1 is substantially dried under reduced pressure at 80° C., the test cell is assembled.

The organic electrolyte is produced by using the following materials and steps:
Prepare a mixed solvent made from ethylene carbonate (EC) and di-ethyl carbonate (DEC) in an equal volume of each, then, dissolve the solute lithium hexafluorophosphate (LiPF6), which is an electrolyte, into the mixed solvent, and finally, adjust the concentration thereof at 1 mol·$1^{-1}$.

The test cell can be interpreted as this: a regular coin-type lithium primary battery, e.g., CR2016 type manganese dioxide lithium battery, of which manganese dioxide positive electrode is replaced with the negative material mold electrode.

The charge and discharge efficiency of the test cell is measured under the following condition: test temperature: 20° C., charge and discharge with current density of 0.5 mA·$cm^{-2}$ constant current, and discharge up to 3 V, then charge down to 0 V, repeat this discharge/charge 50 cycles.

Table 1(A) lists the following items; (a) mixing ratios of the raw materials for the negative electrode material prepared, (b) heating temperature, (c) component of the solid phases A and B of the negative electrode material prepared and (d) the electronic conductivity as well as ionic conductivity of the solid phase B.

Table 1(B) lists the following data both at the initial cycle and at the 50th cycle; charge and discharge capacities, efficiency thereof, and the change ratio of discharge capacity, where, the efficiency of charge and discharge is represented by:
(discharge capacity/charge capacity)×100, and
the change ratio of discharge capacity is represented by
(discharge capacity at the 50th cycle/discharge capacity at 1st cycle)×100.

Table 1(B) also lists the following data of the conventional materials in order to show a comparison list with each sample used in the embodiments of the present invention; For the comparison, produce the negative electrode material based on the same condition as the above sample by using a host material which is able to absorb and desorb lithium ion through charge and discharge, and also produce the test cell based on the same condition, then perform the charge and discharge cycling test. The following conventional materials are employed in this test:

Conventional case 1: silicon powder of which particle size is not more than 150 μm, Conventional case 2: Put mixed product of silicon powder and naphthalene pitch in the alumina crucible, and then heat it at 1000° C. by the electric furnace for one hour under argon atmosphere, then, cool the product down to the room temperature, and crush the product into powder of which particle size is not more than 150 μm. It is confirmed through analysis that the powder is a complex where silicon and carbon are mildly combined.

Conventional case 3: natural graphite powder of which particle size is not more than 150 μm, Conventional case 4: powder of intermetallic compound Mg2Si of which particle size is not more than 150 μm, As Table 1(A) shows, the samples 1–8 used in the exemplary embodiment 1 of the present invention are proved composite particles by EPMA method, i.e., the composite particles comprise the following materials:

(a) solid phase A forming a core comprising metal lithium, and (b) solid phase B wrapping the solid phase A, the solid phase B comprising an intermetallic compound of lithium and the element being able to alloy with lithium.

When the above intermetallic compound which forms the solid phase B is independently prepared, and electronic conductivity as well as ionic conductivity of the powder thereof are measured, all the solid phases B are proved as mixed conductors.

The powders of each sample used in the first exemplary embodiment are composite particles formed by peritectic phenomenon.

The discharge capacity at the initial cycle of each sample powder is at least 650 mAh·$cm^{-3}$ which is approximately the same level as those of the conventional case 1 (silicon) and case 2 (complex of silicon and carbon), and higher level than those of the conventional case 3 (natural graphite) and case 4 (Mg2Si).

The efficiencies of charge and discharge at the initial cycle of each sample powder indicate at least 90% that of the conventional case 3 (negative electrode material by natural graphite.)

Regarding the discharge capacity at the 50th cycle, the conventional cases 1 and 2, which indicated large discharge capacities at the initial cycle, show drastic decreases, while the conventional cases 3 (natural graphite) and 4 (Mg2Si) show little change in the discharge capacities. Each sample powder used in the first exemplary embodiment of the present invention, on the other hand, retains at least 75% of the discharge capacity sustainable rate, and has a larger discharge capacity than those of the conventional cases 3 and 4 by 10–30%.

The metal lithium forming the solid phase A has a high capacity density in itself; however, it shows a drastic decrease in a discharge capacity. The intermetallic compounds of lithium and respective element being able to alloy with lithium, which forms the solid phase B, is the mixed conductor and has excellent cycle characteristics; however, the capacity density thereof is not so high. When the composite particle comprising the solid phases A and B is employed as the negative electrode material, the solid phase B having the excellent cycle characteristics restrains the metal lithium which has high capacity density and forms the solid phase A from being decreased in the discharge capacity due to the charge and discharge cycles, i.e., the solid phases A and B complement each other.

Since the composite particle used in the first exemplary embodiment of the present invention has included lithium (active material) in the form of metal or intermetallic compound, it is appropriate to use this composite particle as the negative electrode material of a battery system such as a practical secondary battery of which operation is started by discharge, while the positive electrode material of this battery system should be selected from oxides and chalcogenides of the transition metal element such as V2O5, TiS2, MoS2 (these correspond to charged condition), and then, organic electrolyte is impregnated into this material, and finally, the positive electrode is assembled.

[Embodiment 2]

In the second exemplary embodiment, a composite particle comprising the following materials is discussed:
(a) solid phase A which forms a core of the particle, and absorbs and disorbs a large amount of lithium ion by charge and discharge,
(b) solid phase B which wraps the solid phase A, and has excellent cycle characteristics of little decreasing in discharge capacity along the cycle progress, though it has the less absorption and disorption amount of lithium ion than the solid phase A.

(1) Preparing powder of the negative electrode material

Heat two granular element materials, which are able to alloy with lithium at a predetermined ratio, up to an appropriate melting temperature, and then crush the sample into powder same as the first exemplary embodiment.

(2) Analyze the section of the prepared powder, and measuring electronic as well as ionic conductivity Perform this step according to that of the first exemplary embodiment.

(3) Evaluate the charge and discharge characteristics of the negative electrode material Form the negative mold electrode same as the first exemplary embodiment, and then produce the test cell under the same condition as the first exemplary embodiment. A different point from the first exemplary embodiment is to start the test by initial charging, while the test in the first exemplary embodiment starts with discharging.

Table 2(A) shows the following data of the solid phases A and B:
mixing ratio, heating temperature of the materials in preparing the negative electrode material, component of the solid phases A and B, and electronic as well as ionic conductivity of the solid phase B.

Table 2(B) shows the following data both at the initial cycle and the 50th cycle of the test cell employing the prepared negative electrode material:
charge and discharge capacities, efficiency of charge and discharge and discharge capacity sustainable rate.

[Note] e.g., in Tables 2(A) and 2(B), the solid phase A of sample No. 15 is indicated as Mn-Als.s., which means the sample is formed by solid solutions of Mn and Al. The same interpretation can be applied to the sample Nos. 19, 20, 41, 42, 47, 49 and 50, which are formed also solid solutions. The solid phases A of sample Nos. 61, 63 and 65 are formed by single element Mo and Si respectively. The other samples' solid phases A and B are formed by intermetallic compound made from two elements.

Each sample used in the second exemplary embodiment is a composite particle comprising the core formed by the solid phase A, and the solid phase B which wraps the core resulting from peritectic phenomenon. The solid phase B, as shown in Table 2(A), is a mixed conductor having electronic conductivity and lithium ionic conductivity, same as used in the first exemplary embodiment.

Table 2(B) proves that the discharge capacity of each sample in the second exemplary embodiment at the initial cycle is greater than those of the conventional cases 1–4 shown in Table 1(B), in particular, eight samples including the sample Nos. 23, 35, 52, 55, 56, 57, 61 and 63 indicate at least 1000 mAh·cm$^{-3}$ of discharge capacity. These negative electrode materials of high capacity include at least one of the following elements which are able to alloy with lithium (active material) in the solid phase A: zinc, cadmium, aluminum, gallium, indium, thallium, silicon, germanium, tin, lead, antimony and bismuth.

The sample No. 65, among others, indicates the largest discharge capacity (1450 MAh·cm$^{-3}$) of which core comprising the solid phase A is formed by silicon.

Regarding the charge and discharge efficiency at the initial cycle, every sample used in the second exemplary embodiment indicates at least 75% and has a greater charge and discharge efficiency than those of the conventional case 1 (silicon), case 2 (complex of silicon and carbon) and case 4 (Mg2Si); however, many of the samples have less capacity than the conventional case 3 (natural graphite indicated 91%), and yet, several samples (e.g., sample Nos. 9–12, 14, 16, 17 and 19) show not less than the charge and discharge efficiency of the case 3.

Regarding the discharge capacity sustainable rate, every sample indicates at least 75%, and majority of the samples indicate 90% or more. These values are less than the conventional case 3 (natural graphite) and case 4 (Mg2Si). On the other hand, the samples indicate far less decrease of discharge capacity due to cycles than those of the conventional case 1 (silicon) and case 2 (complex of silicon and carbon.)

Based on the data of charge and discharge characteristics both at the initial cycle and 50th cycle, it should be noted that the solid phase A is formed by, as previously described, at least one of the following elements which absorb and desorb a large amount of lithium by charge and discharge:
zinc, cadmium, aluminum, gallium, indium, thallium, silicon, germanium, tin, lead, antimony and bismuth,
or formed by either a solid solution or intermetallic compound including an element which is able to alloy with lithium as described above.

The following samples show at least 90% of discharge capacity sustainable rate after the 50th cycle, and thus they are proved to have an excellent cycle characteristic: sample Nos. 2 used in the first exemplary embodiment, sample Nos. 9–17, 19–44, 46–50, 52–61, 63–68 and 70–72 in the second exemplary embodiment.

In the negative electrode materials which show excellent cycle characteristics as described above, it is understandable that the solid phase B is formed by either a solid solution or intermetallic compound including at least one element selected from a group of alkaline earth elements and transition metal elements.

Although Tables 2(A) and 2(B) did not list the following samples, Mg2Si, Mg2Pb, Mg2Sn, Mg2Ge, and transition metal element silicides other than NiSi, such as FeSi2, CoSi2, they have great potentials for forming the solid phase B.

In the sample No. 65 made of composite particles comprising the solid phases A and B, silicon forming the solid phase A is able to alloy with lithium. When silicon alone is employed in the negative electrode as a host material (corresponding to the conventional case 1), an initial charge capacity at the initial cycle indicates, as shown in Table 1(B), 5600 mAh·cm$^{-3}$ as well as such a large amount exceeding 4000 mAh·g$^{-1}$. However, as the absorption of lithium ion progresses, the crystal structure of silicon changes, i.e., a lattice interval of a crystal expands, and a swelling volume reaches to max. four times, which results in a crack on crystal particle boundaries of silicon.

When silicon is shrunk by the initial discharge, the crystal particles thereof progresses in fineness and becomes finer than those before the initial charge. This progressive fineness increases ohmic contact resistance and lowers electronic conductivity between particles. As a result, over voltage applied to the negative electrode at discharge increases, and thus the discharge capacity at the initial cycle reaches to less than a half of the initial charge capacity. The lithium which has not been utilized as the initial discharge capacity remains in the negative electrode as dead lithium, and does not contribute to charge reaction thereafter.

When the battery is charged at the second cycle, the silicon particle having the higher electric resistance due to progressive fineness finds itself difficult to be alloyed, and only the silicon particle that has a relatively higher electronic conductivity and does not progress in fineness is alloyed, the charge capacity of the battery thus reaches to as low as 20% that of the initial charge. Silicon progresses in fineness at the 2nd cycle discharge, and the discharge capacity further lowers accordingly. Repeating charge and discharge less than 20 cycles brings the battery being unable to charge or discharge at all. In the negative electrode in such a condition, the specific surface area increases due to progressive fineness of silicon, and also a lot of dead lithium exists, therefore, the negative electrode is extremely unstable from the thermal view of point, and thus this condition involves safety concern.

The material NiSi$_2$ forming the solid phase B of sample No. 65, on the other hand and different from Si, absorbs and disorbs lithium by charge and discharge within the crystal lattices, thus the crystal structure changes little. As a result, the crystal swells and shrinks little, and the particle fineness does not progress, neither dead lithium nor increasing of the specific surface area can be observed. Accordingly, it is not worth worrying drastic decrease of discharge capacity due to cycles; however, the employment of NiSi$_2$ still cannot provide a satisfactory level of high capacity when a high capacity-oriented battery is desired with the discharge capacity of 250 mAh·g$^{-1}$. Such a small discharge capacity is disadvantage for evaluating a high rate charge and discharge characteristics.

In the composite particle comprising the solid phases A and B, according to the present invention, a host material of lithium comprising the solid phase A formed by Si and the solid phase B formed by NiSi$_2$ is employed as the negative electrode material. In this case, Si and NiSi$_2$ are bound each other strongly at the boundary face, and easy to be electrically conductive. During the charge and discharge, NiSi$_2$ swells and shrinks far less than Si does, and thus restrains Si from swelling and shrinking within two times of the original volume which is restorable elastic limit for the crystal structure. The amount of lithium absorbed and disorbed by charge and discharge decreases responsive to the restrained amount of Si, and is less than the case where Si alone is used. However, since the solid phase B, which comprises NiSi$_2$, a mixed conductor having electronic and lithium ionic conductivity, wraps the solid phase A comprising Si, electrons can move between Si and NiSi$_2$ as described above.

When lithium ion is absorbed into Si as well as NiSi$_2$ from non-aqueous electrolyte by charging, electrons are provided from electron cloud which is formed by mixing Si and NiSi$_2$. Therefore, the total lithium amount absorbed into Si and NiSi$_2$ is less than the case of Si alone, and yet, it is substantially greater than the case of NiSi$_2$ alone.

The above description proves that when the composite particle formed by the solid phases A (Si) and B (NiSi$_2$) according to the present invention is employed as the negative electrode material, the negative electrode shows the less decrease of discharge capacity due to cycles, and has the greater capacity than those of the conventional case 3 (natural graphite) and case 4 (Mg$_2$Si) both of which have excellent cycle characteristics and relatively high capacities.

The safety of the negative electrode material for non-aqueous electrolyte secondary battery is tested with "solder iron method" named by the inventors' group. The method is as follows: First, charge the test cell which underwent the 50-cycle charge and discharge test, and second, disassemble the test cell in a glove box under dry air of less than 5% relative humidity, then, dry vacuum the disassembled cell. Then, press a solder iron heated up to ca. 300° C. to the negative material mold electrode 5 which has been molded with the current collector 3 into one body still remained in the cell case. Then, the following phenomena are observed:

Conventional case 1 (Si); The sample generates white fuming, but no spark or combustion.

Conventional case 2 (complex of Si and Co) and case 3 (natural graphite); The sample is burnt excitedly.

Conventional case 4 (MgNi$_2$); No change in appearance is observed.

Embodiment 1 and Embodiment 2 of the present invention; There are no white fuming, spark, or combustion, thus no change is observed. As a result, the samples of the present invention are proved to be the most reliable from the safety view of point.

It can be concluded that the negative electrode material comprising the composite particles formed by the solid phases A and B is highly safety and has the less decrease of discharge capacity due to cycles as well as the higher capacity than the conventional materials.

[Embodiment 3]

In the third exemplary embodiment, variation of a material mixing ratio (at. %) between Si and Ni, particle size (average) variation due to pulverize, and resulting specific surface area variation thereof, are discussed what influences these variations give the charge and discharge characteristics.

(1) Preparing powder of the negative electrode material.

Vary the raw material mixing ratio between granular Ni and Si, and heat each sample up to an appropriate melting temperature, then crush an ingot same as the first exemplary embodiment, then sift the sample into several groups based on an average particle size.

(2) Measuring the average particle size.

Measure the average particle size with the particle size distribution measuring method by LASER.

(3) Measuring the specific surface area of the prepared powder using BET method by N$_2$ gas adorption.

(4) Measuring a percentage content of nickel silicide in the prepared powder.

Dissolve the prepared powder into hydrochloric acid, and drop ethanol solution of dimethylglyoxime so that dimethylglyoximat-nickel (II) deposits, then, find the total amount of nickel, finally, convert the amount into NiSi$_2$ as the percentage content of nickel silicide.

(5) Evaluating the charge and discharge characteristics of the negative electrode materials.

Form a negative material mold electrode same as the first exemplary embodiment, and then, produce a test cell under the same condition as the first exemplary embodiment. Repeat charge and discharge 50 cycles on the test cell under the same condition as the second exemplary embodiment.

The test result is shown in Table 3. In order to compare each sample in the third exemplary embodiment with the conventional materials, Table 4 lists the following data: Each sample of the conventional cases 1–4 are sifted into several groups depending on the particle size, each group thus has a specific surface area responsive to the particle size. Each group undergoes 50 cycles of charge and discharge. The test result is listed in Table 4.

As Tables 3 and 4 indicate, Sample Nos. 74a–f (the percentage content of the solid phase B is 30%, and the solid phase B is assumed $NiSi_2$) drastically lower the discharge capacity sustainable rate down to as low as 20–30% after the 50th cycle. On the other hand, Sample Nos. 75a–f, 76a–f, 77a–f and 78a–f maintain the rate at as high as 97–98%. In the case of Sample Nos. 74a–f, the percentage content of $NiSi_2$ which forms the solid phase B is rather low at 30%, and the percentage content of Si in the solid phase A is high. This composition drastically lowers the discharge capacity along with the progressive cycles although a high capacity of charge and discharge is reserved at the initial cycle. This data proves that the presence of $NiSi_2$ in the solid phase B at a low percentage content cannot restrain Si from swelling and shrinking due to charge and discharge.

Sample Nos. 78a–f which have the higher percentage content of $NiSi_2$ in the solid phase B, on the other hand, retain the discharge capacity sustainable rate due to cycles at as high as 98%, however, the charge and discharge capacities thereof are not larger than those of Sample No. 65 in the second exemplary embodiment, Sample Nos. 75a–f, 76a–f and 77a–f in this exemplary embodiment. An excessively low percentage content of Si forming the solid phase A causes this phenomenon.

The nickel silicide forming the solid phase B is assumed $NiSi_2$ in this embodiment; however, there are many nickel suicide such as $NiSi$, $Ni_3Si_2$, $Ni_2Si$, etc. However, it is practically impossible to separate these materials quantatively, thus, a main component $NiSi_2$ is described representatively.

It is concluded that the appropriate percentage content of nickel suicide (assuming $NiSi_2$) forming the solid phase B ranges between 40–95 weight %.

Regarding the percentage content in the solid phase B, the case where the solid phase A formed by Si and the solid phase B formed by $NiSi_2$ has been detailed. In the case of the first exemplary embodiment and the second exemplary embodiment, each sample shows an excellent charge and discharge characteristics when the percentage content thereof in the solid phase B ranges the same limits, i.e., 40–95%.

When the average particle size becomes smaller, the responsive specific surface area thereof increases. This phenomenon is observed in each sample used in this third exemplary embodiment and the conventional cases 1–4.

Regarding each samples in this third exemplary embodiment, a correlation between the average particle size and the charge and discharge capacities both at the initial and 50th cycles is verified; A distinct difference is observed between two groups having different ranges of average particle size, i.e., 100–50 $\mu$m and 40–0.5 $\mu$m. In the case of the first group having 100–50 $\mu$m average particle size has lower charge and discharge capacity than the second group having 40–0.5 $\mu$m by ca. 200 mAh·cm$^{-3}$. When the particles have a larger average size such as 100–50 $\mu$m, diffusion in the solid phase delays, and thus an over voltage increases, which lowers the charge and discharge capacity.

As indicated in Table 4, the conventional samples 1a–f through 4a–f show the following phenomena:

Conventional sample 3a–f: Natural graphite is proved an excellent material for the negative electrode because of a) extremely high efficiency of charge and discharge both at the initial and 50th cycles, and b) extremely small decrease in discharge capacity due to cycles, however, the charge and discharge capacities thereof does not reach to 500 mAh·cm$^{-3}$, therefore, natural graphite is not appropriate for high capacity oriented battery. These characteristics are not changed by variation of the average particle size.

Conventional samples 1a–f and 2a–f: The complex of silicon and carbon shows a poor cycle characteristic, and this is not improved by the variation of average particle size.

Conventional samples 4a–f: $Mg_2Si$ shows low efficiency of charge and discharge at the initial cycle. As same as the conventional samples 3a–f, $Mg_2Si$ shows little decrease in the discharge capacity due to cycles, and yet the charge and discharge capacity at the 50th cycle does not reach to 500 mAh cm$^{-3}$, accordingly, $Mg_2Si$ is not appropriate for the high-capacity oriented battery. These characteristics are not changed by the variation of average particle size.

Based on the above discussion, it is proved that the samples of each exemplary embodiment according to the present invention have the better charge and discharge characteristics than those of the conventional samples.

The test cells undergone the 50 cycles of charge and discharge test is charged again for evaluating the safety of each negative electrode material by the "solder iron method." Here is the evaluation report:

Sample Nos. 74a–f: White fuming is observed in every sample, for due to low percentage content of $NiSi_2$ forming the solid phase B, the presence of $NiSi_2$ cannot restrain Si forming the solid phase A from swelling and shrinking, and thus these samples react in the same way as the negative electrode material which employs Si alone did.

Sample Nos. 75a–f through 78a–f: A little white fuming is observed in Sample Nos. 75a, 76a, 77a and 78a of which average particle size is 0.5 $\mu$m. In this case, a specific surface area is larger than 10 m$^2$g$^{-1}$, which means an active surface area has majority, thus concerns are involved in the safety aspect.

Other samples do not show any white fuming, spar, or combustion, and they have no problem in the safety as Sample No. 65 did in the second exemplary embodiment.

As a result, an excellent negative electrode material can be specified as follows based on the third exemplary embodiment:

the solid phase A is formed by Si,
the solid phase B is formed by $NiSi_2$,
the average particle size ranges between 1 and 40 $\mu$m,
the specific surface area ranges between 0.01 and 10 m$^2$g$^{-1}$ The material having the above specifications has an excellent charge and discharge characteristics and has no problem in safety. The above specification, however, has a premise that the percentage content of nickel suicide forming the solid phase B ranges between 40 weight % and 95 weight %, as previously described.

[Embodiment 4]

When every sample used in each exemplary embodiment is observed in its section through electron microscope, the core comprising the solid phase A reveals that it is not always wrapped up completely with the solid phase B. In the fourth exemplary embodiment, an exposed area of Si on a particle which forms the solid phase A vs. total surface area of the particle is discussed what influence this factor gives the charge and discharge characteristics. Samples used in this fourth exemplary embodiment are the same composite particle as those used in the third exemplary embodiment, and Sample No. 65 in the second exemplary embodiment, i.e., the solid phase A is formed by Si, and the solid phase B is formed by nickel silicide.

(1) Preparing powder of the negative electrode material

Vary the raw material mixing rate of granular Si and Ni, and heat the samples up to a responsive appropriate melting temperature. After the powder of the sample is obtained, the powder is sorted into the following several groups through EPMA and an electron microscope: Silicon exposed area ratio against the overall particle surface area are 0, 2, 5, 10, 20, 40, 60, and 100%. In the case of 100% ratio, the negative electrode material made from Si alone which is used in the conventional case 1 is employed.

(2) Evaluating the charge and discharge characteristics of the samples

Form a negative material mold electrode same as the first exemplary embodiment, and produce a test cell under the same condition as the first exemplary embodiment. Charge the test cell with 0.5 mA·cm$^{-2}$ at 20° C., then, discharge it down to 3.0 V with varying the discharge rate such as 0.5, 0.7, 1.4, 2.0 and 3.0 mA·cm$^{-2}$. The discharge capacity at the lowest discharge rate 0.5 mA·cm$^{-2}$ is expressed 100, and find the discharge capacity ratio at each discharge rate. The indications found are called "change ratio of discharge capacity." These information is listed in Table 5.

When the Si exposed area ratio is 5% or more against the overall surface area of the particle of negative electrode material, the material is proved to have an excellent high rate discharge characteristic. However, when the Si expose ratio reaches to as high as 40% or more, the amount of Si forming the solid phase A is excessive, which lowers the cycle characteristic. Accordingly the Si exposed area ratio is preferably adjusted to range between 5% and 40%. This condition is effective both at high rate charge and high rate discharge.

When the overall surface area of the particle is wrapped up completely with nickel silicide forming the solid phase B, the sample does not always show an excellent high rate charge and discharge characteristics, as described above. When Si of the solid phase A is exposed on the particle surface at an appropriate exposing ratio, this exposed Si can absorb and desorb a lot of lithium, and thus a speed of a lithium absorption and desorption is accelerated by this Si together with the nickel silicide. As a result, the high rate charge and discharge characteristics are improved.

[Embodiment 5]

Figure 2:
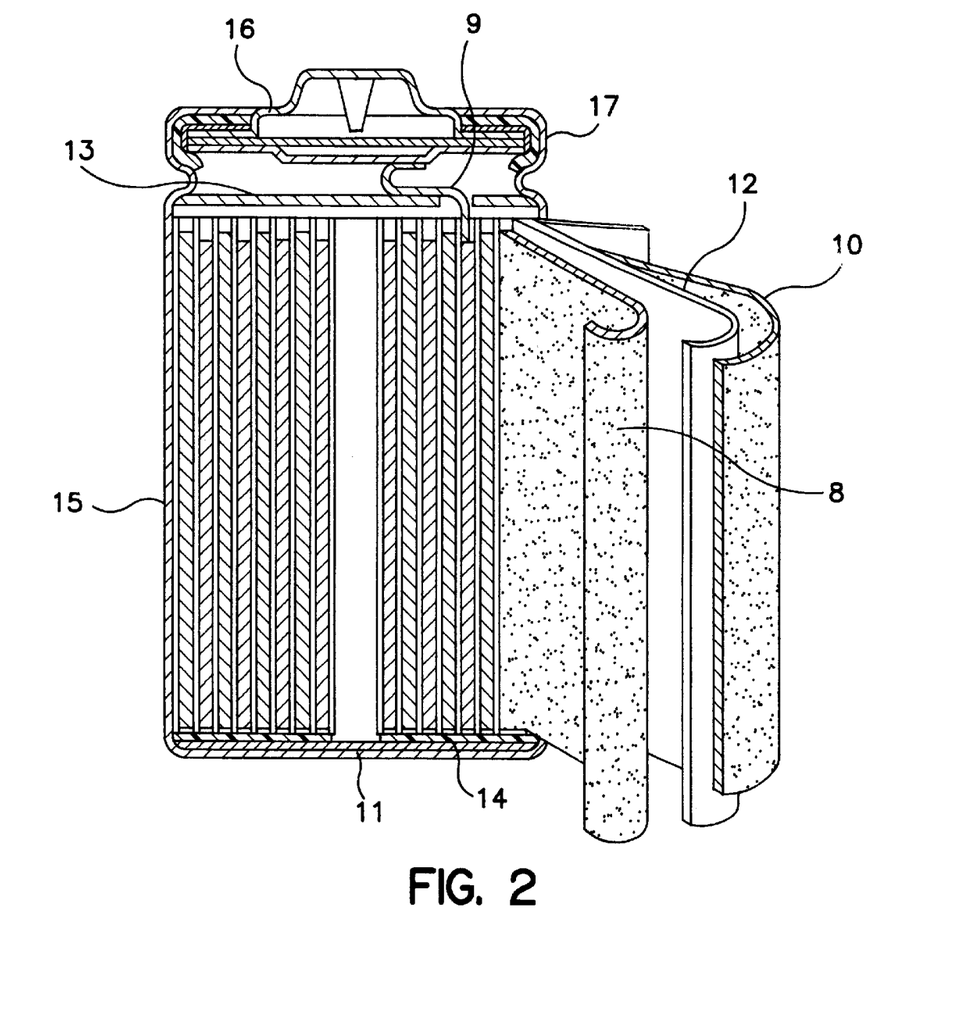
FIG. 2 is a vertical cross sectional view of a cylindrical cell utilized in an exemplary embodiment of a non-aqueous electrolyte secondary battery having a negative electrode which employs the material of the present invention.

Use Sample No. 65 in the second exemplary embodiment as the negative electrode material, and select one of the following materials as a positive electrode material, then produce a cylindrical cell having a nominal capacity 780 mAh (overall height: 50 mm, outer diameter: 17 mm) as shown in FIG. 2. The cylindrical cell undergoes the charge and discharge cycle test.

Materials for the positive electrode: lithium contained cobalt oxides (LiCoO$_2$), lithium contained nickel oxides, spinel-type lithium contained manganese oxides (LiMn$_2$O$_4$).

The cylindrical cell shown in FIG. 2 is assembled through the following steps:

(a) Roll an electrode group comprising a positive electrode plate 8, a negative electrode plate 10 and a microporous polyporpylene membrane 12 as the separator inserted between the plates 8 and 10.

(b) Mount an upper insulating plate 13 and a lower insulating plate 14 made of polypropylene to the rolled electrode group.

(c) Put the above assembled electrode group and insulating plates into a cell case 15 made of nickel plated steel.

(d) Weld one end of a positive lead tab 9 to a lower surface of a cover 16 into which an explosion-proof mechanism has been built. The cover 16 is coupled with a gasket 17 made of polypropylene.

(e) Weld one end of a negative lead tab 11 which has been welded to the negative electrode 10 to an inside bottom surface of the cell case 15.

(f) Pour predetermined amount of organic electrolyte as non-aqueous electrolyte.

(g) After the electrolyte is absorbed and impregnated into the electrode group, seal an upper edge of the cell case 15 and the cover 16 through the gasket 17 liquid-tightly as well as gas-tightly.

(h) Provide the sealed cell case with an insulating package (not shown) to complete the cell.

The positive electrode 8 is produced through the following steps:

Prepare the following materials: three kinds of powders of positive electrode material (100 weight), carbon black as conductive agent (2.5 weight), aquatic-dispersion solution of polytetrafluoroethylene as binder (7 weight).

Knead the above prepared materials into paste, coat both sides of aluminum foil (core material) with the paste, dry the paste, and then, roll the coated foil with pressure, cut the rolled foil into a plate having a predetermined size, and mount the positive lead tab 9 made of titan to the plate by spot welding.

The negative electrode 10 is produced through the following steps:

Prepare Sample No. 65, which comprises the solid phase A formed by Si and the solid phase B formed by NiSi$_2$, as a negative electrode material, add polyvinylidene fluoride (PVDF) as binder and natural graphite, knead the above mixed materials into paste, coat both sides of copper foil (core material) with the paste, dry the paste, roll the foil with pressure, cut the rolled foil into a plate having a predetermined size, and mount the negative lead tab 11 made of copper to the plate by spot welding.

The organic electrolyte used in the coin type test cell is employed as non-aqueous electrolyte, i.e., dissolve LiPF6 into the mixed solvent comprising the same volume of EC (ethylene carbonate) and DEC (di-ethyl carbonate).

Table 6 shows the following data: Vary the component of the negative electrode paste responsive to each positive electrode material, then measure the discharge capacities of every combination at the initial cycle and after the 500th cycle, and calculate the discharge capacity sustainable rate.

The condition of charge and discharge test is as follows:

repeat charge and discharge with a constant current of 0.2 CmA (156 mA) at 20° C., charge end voltage: 4.2 V discharge end voltage: 3.0 V As shown in Table 6, when the percentage content of natural graphite powder in the negative electrode paste ranges between 5–80 weight %, the discharge capacity sustainable rate after the 500th cycle stays at least 80%, relatively higher value for each positive electrode material. On the other hand, when the percentage content is less than 5 weight %, the electronic conductivity lowers and the over voltage increases, thus, the cycle characteristic lowers. However, when the percentage content exceeds 80 weight %, the cycle characteristic also lowers because the diffusion resistance of lithium ion increases, thereby increasing non-reacted part within the plate. Therefore, it is desirable to adjust the percentage content of natural graphite powder between 5–80 weight %.

In this embodiment, the natural graphite powder is detailed, however, other materials such as carbon black including acetylene black, and carbon materials including artificial graphite, graphitisable carbon such as mesophase micro beads, fibrous graphite, and nongraphitisable carbon can be also employed.

In this embodiment, the mixed solution comprising the same volume of EC and DEC is described as the organic electrolyte, however, the following materials can be used as an electrolyte: lithium salts such as lithium perchlorate ($LiCl_4$), lithium tetrafluoroborate ($LiBF_4$), lithium trifluoromethane sulfonate ($LiCF_3SO_3$), lithium hexafluoroarsenate ($LiAsF_6$), and organic solutions including circular ester such as propylene carbonate, circular ether such as tetrahydrofuran, chain ether such as di-methoxyethan, chain ester such as methylpropionate, as itself alone, and mixed solvent two kinds or more.

Further, it is not necessary to limit the electrolyte to the organic electrolyte, and thus solid polymer electrolyte, gel polymer electrolyte having organic solvent as plasticizer in addition to the solid polymer electrolyte can be used.

The test cell used in every embodiment is coin type and cylindrical, however, effect of the present invention does not change depending on a cell shape. The same effect can be expected in a square type cell as well as a sheet type thin-cell.

The positive electrode materials are not necessarily limited to three materials shown in the fifth exemplary embodiment. As described in the first exemplary embodiment, $V_2O_5$, $TiS_2$, $MoS_2$, etc. can be employed.

In each exemplary embodiment, all the samples of the negative electrode materials are described to comprise two types of elements such as lithium and an element being able to alloy with lithium; however, the material can be prepared by using more than three elements upon request.

TABLE 1(A)

|  | Raw Materials Mixing Ratio (at. %) | | Heating temperature (° C.) | Component of negative electrode materials | | Conductivity of solid phase B (S · cm$^{-1}$) | |
| --- | --- | --- | --- | --- | --- | --- | --- |
|  | I | II |  | Solid phase A | Solid phase B | Electronic conductivity | Ion conductivity |
| Sample No. 1 | Li:67 | Al:33 | 600 | Li | $Li_2Al$ | $10^0$ order | $10^{-5}$ order |
| Sample No. 2 | Li:75 | Cd:25 | 400 | Li | $Li_3Cd$ | $10^0$ order | $10^{-5}$ order |
| Sample No. 3 | Li:80 | Bi:20 | 1200 | Li | $Li_3Bi$ | $10^0$ order | $10^{-5}$ order |
| Sample No. 4 | Li:82 | Sn:18 | 800 | Li | $Li_4Sn$ | $10^0$ order | $10^{-5}$ order |
| Sample No. 5 | Li:50 | Zn:50 | 500 | Li | $LiZn$ | $10^0$ order | $10^{-5}$ order |
| Sample No. 6 | Li:80 | Tl:20 | 400 | Li | $Li_4Tl$ | $10^0$ order | $10^{-5}$ order |
| Sample No. 7 | Li:80 | Pb:20 | 750 | Li | $Li_4Pb$ | $10^0$ order | $10^{-5}$ order |
| Sample No. 8 | Li:60 | In:40 | 500 | Li | $LiIn$ | $10^0$ order | $10^{-5}$ order |

TABLE 1(B)

|  | Component of negative electrode material | | Initial cycle | | | 50th cycle | | | Discharge Capacity Sustainable rate (%) |
| --- | --- | --- | --- | --- | --- | --- | --- | --- | --- |
|  | Solid Phase (A) | Solid phase (B) | Charge capacity (mAh · cm$^{-3}$) | Discharge capacity (mAh · cm$^{-3}$) | Efficiency of charge & discharge (%) | Charge capacity (mAh · cm$^{-3}$) | Discharge capacity (mAh · cm$^{-3}$) | Efficiency of charge & discharge () |  |
| Sample No. 1 | Li | $Li_2Al$ | 699 | 650 | 93 | 645 | 501 | 78 | 77 |
| Sample No. 2 | Li | $Li_3Cd$ | 773 | 665 | 92 | 631 | 606 | 96 | 91 |
| Sample No. 3 | Li | $Li_3Bi$ | 736 | 670 | 91 | 650 | 514 | 76 | 77 |
| Sample No. 4 | Li | $Li_4Sn$ | 740 | 688 | 93 | 678 | 529 | 78 | 77 |
| Sample No. 5 | Li | $LiZn$ | 712 | 655 | 92 | 634 | 602 | 95 | 92 |
| Sample No. 6 | Li | $Li_4Tl$ | 717 | 667 | 93 | 639 | 505 | 79 | 76 |
| Sample No. 7 | Li | $Li_4Pb$ | 794 | 715 | 90 | 700 | 560 | 80 | 78 |
| Sample No. 8 | Li | $LiIn$ | 775 | 705 | 91 | 691 | 560 | 81 | 79 |
| Conventional case 1 |  | Si | 5600 | 840 | 15 | 10 | 1 | 10 | 0 |
| Conventional case 2 |  | Si + C | 2300 | 599 | 26 | 105 | 16 | 15 | 3 |
| Conventional case 3 |  | C (Natural Graphite) | 490 | 448 | 91 | 446 | 445 | 100 | 99 |
| Conventional case 4 |  | $Mg_2Si$ | 1120 | 461 | 41 | 451 | 449 | 100 | 97 |

TABLE 2(A)

| | Raw Materials mixing Ratio (at. %) | | Heating temperature | Component of negative electrode materials | | Conductivity of solid phase B (S · cm$^{-1}$) | |
|---|---|---|---|---|---|---|---|
| | I | II | (° C.) | Solid phase A | Solid phase B | Electronic conductivity | Ion conductivity |
| Sample No. 9 | Al:67 | Ba:33 | 1100 | BaAl$_4$ | BaAl$_2$ | 10° order | 10$^{-4}$ order |
| Sample No. 10 | Al:80 | Ca:20 | 970 | CaAl$_2$ | CaAl$_4$ | 10° order | 10$^{-4}$ order |
| Sample No. 11 | Al:80 | Ce:20 | 1300 | CeAl$_2$ | CeAl$_2$ | 10° order | 10$^{-5}$ order |
| Sample No. 12 | Al:82 | Co:18 | 1150 | Co$_2$Al$_5$ | Co$_2$Al$_9$ | 10° order | 10$^{-4}$ order |
| Sample No. 13 | Al:80 | Cr:20 | 1150 | CrAl$_3$ | CrAl$_4$ | 10° order | 10$^{-4}$ order |
| Sample No. 14 | Al:75 | Fe:25 | 1200 | Fe$_2$Al$_5$ | FeAl$_3$ | 10° order | 10$^{-4}$ order |
| Sample No. 15 | Al:77 | Mn:23 | 1140 | Mn—Al s.s. | MnAl$_3$ | 10° order | 10$^{-4}$ order |
| Sample No. 16 | Al:75 | Ni:25 | 1120 | Ni$_2$Al$_3$ | NiAl$_3$ | 10° order | 10$^{-4}$ order |
| Sample No. 17 | Al:75 | Pd:25 | 920 | Pd$_2$Al$_3$ | PdAl$_3$ | 10° order | 10$^{-4}$ order |
| Sample No. 18 | Al:84 | Te:16 | 810 | Al$_2$Te$_3$ | Al$_5$Te | 10° order | 10$^{-5}$ order |
| Sample No. 19 | Al:75 | Th:25 | 1450 | Al—Th s.s. | ThAl$_3$ | 10° order | 10$^{-4}$ order |
| Sample No. 20 | Al:75 | Ti:25 | 1380 | Ti—Al s.s. | TiAl$_3$ | 10° order | 10$^{-3}$ order |
| Sample No. 21 | Al:75 | V:25 | 1430 | V$_5$Al$_5$ | VAl$_3$ | 10° order | 10$^{-3}$ order |
| Sample No. 22 | Al:93 | W:7 | 1280 | WAl$_5$ | WAl$_{12}$ | 10° order | 10$^{-4}$ order |
| Sample No. 23 | Ba:20 | Mg:80 | 680 | Mg$_9$Ba | Mg$_4$Ba | 10° order | 10$^{-4}$ order |
| Sample No. 24 | Ba:50 | Pb:50 | 900 | Ba$_2$Pb | BaPb | 10° order | 10$^{-3}$ order |
| Sample No. 25 | Ba:83 | Sn:17 | 700 | BaSn$_3$ | BaSn$_5$ | 10° order | 10$^{-4}$ order |
| Sample No. 26 | Bi:75 | Ca:25 | 680 | BaCa$_3$ | Bi$_3$Ca | 10° order | 10$^{-4}$ order |
| Sample No. 27 | Bi:67 | Ce:33 | 1350 | BiCe | Bi$_2$Ce | 10° order | 10$^{-4}$ order |
| Sample No. 28 | Bi:75 | Ni:25 | 780 | NiBi | NiBi$_3$ | 10° order | 10$^{-4}$ order |
| Sample No. 29 | Bi:67 | Rh:33 | 850 | RhBi | RhBi$_2$ | 10° order | 10$^{-5}$ order |
| Sample No. 30 | Ca:67 | Si:33 | 1000 | CaSi | Ca$_2$Si | 10° order | 10$^{-3}$ order |
| Sample No. 31 | Ca:33 | Si:67 | 1190 | CaSi | CaSi$_2$ | 10° order | 10$^{-4}$ order |
| Sample No. 32 | Ca:25 | Tl:75 | 570 | Ca$_3$Tl$_4$ | CaTl$_3$ | 10° order | 10$^{-5}$ order |
| Sample No. 33 | Ca:50 | Zn:50 | 670 | CaZn$_2$ | CaZn | 10° order | 10$^{-4}$ order |
| Sample No. 34 | Cu:25 | Cd:75 | 570 | Cu$_5$Cd$_8$ | CuCd$_3$ | 10° order | 10$^{-5}$ order |
| Sample No. 35 | Mg:67 | Ce:33 | 820 | Mg$_3$Ce | Mg$_2$Ce | 10° order | 10$^{-3}$ order |
| Sample No. 36 | Zn:8 | Ce:92 | 1000 | CeZn$_8$ | CeZn$_{11}$ | 10° order | 10$^{-5}$ order |
| Sample No. 37 | Co:40 | Ge:60 | 980 | CoG$_6$ | Co$_2$Ge$_3$ | 10° order | 10$^{-5}$ order |
| Sample No. 38 | Co:33 | Sb:67 | 1100 | CoSb | CoSb$_2$ | 10° order | 10$^{-3}$ order |
| Sample No. 39 | Co:33 | Sn:67 | 1100 | CoSn | CoSn$_2$ | 10° order | 10$^{-3}$ order |
| Sample No. 40 | Cr:33 | Sb:67 | 1000 | CrSb | CrSb$_2$ | 10° order | 10$^{-4}$ order |
| Sample No. 41 | Cu:68 | Sb:32 | 670 | Sb—Cu s.s. | Cu$_2$Sb | 10° order | 10$^{-5}$ order |
| Sample No. 42 | Fe:33 | Sb:67 | 950 | Fe—Sb s.s. | FeSb$_2$ | 10° order | 10$^{-5}$ order |
| Sample No. 43 | Ni:20 | Ga:80 | 900 | Ni$_2$Ga$_3$ | NiGa$_4$ | 10° order | 10$^{-5}$ order |
| Sample No. 44 | Pr:50 | Ga:50 | 1250 | PrGa$_2$ | PrGa | 10° order | 10$^{-6}$ order |
| Sample No. 45 | Ga:25 | Te:75 | 650 | Ga$_2$Te$_3$ | GaTe$_3$ | 10° order | 10$^{-5}$ order |
| Sample No. 46 | Mn:60 | Ge:40 | 980 | Mn$_5$Ge$_3$ | Mn$_3$Ge$_2$ | 10° order | 10$^{-6}$ order |
| Sample No. 47 | Ni:50 | Ge:50 | 950 | Ni—Ge s.s. | NiGe | 10° order | 10$^{-4}$ order |
| Sample No. 48 | Zr:75 | Ge:25 | 2200 | Zr$_2$Ge | Zr$_3$Ge | 10° order | 10$^{-5}$ order |
| Sample No. 49 | Mn:75 | In:25 | 1000 | Mn—In s.s. | Mn$_3$In | 10° order | 10$^{-5}$ order |
| Sample No. 50 | Ni:50 | In:50 | 970 | Ni—In s.s. | NiIn | 10° order | 10$^{-4}$ order |
| Sample No. 51 | In:28 | Te:72 | 650 | In$_2$Te$_3$ | In$_2$Te$_5$ | 10° order | 10$^{-5}$ order |
| Sample No. 52 | Mg:90 | La:10 | 760 | Mg$_3$La | Mg$_9$La | 10° order | 10$^{-5}$ order |
| Sample No. 53 | La:33 | Sb:67 | 1350 | LaSb | LaSb$_2$ | 10° order | 10$^{-4}$ order |
| Sample No. 54 | La:8 | Zn:92 | 1000 | LaZn$_3$ | LaZn$_{13}$ | 10° order | 10$^{-5}$ order |
| Sample No. 55 | Mg:67 | Ni:33 | 900 | MgNi$_2$ | Mg$_2$Ni | 10° order | 10$^{-5}$ order |
| Sample No. 56 | Mg:90 | Pr:10 | 720 | Mg$_3$Pr | Mg$_9$Pr | 10° order | 10$^{-5}$ order |
| Sample No. 57 | Mg:75 | Sr:25 | 700 | Mg$_2$Sr | Mg$_3$Sr | 10° order | 10$^{-5}$ order |
| Sample No. 58 | Mg:50 | Zn:50 | 570 | MgZn$_2$ | MgZn | 10° order | 10$^{-3}$ order |
| Sample No. 59 | Mn:77 | Si:23 | 1160 | Mn$_5$Si$_3$ | Mn$_3$Si | 10° order | 10$^{-5}$ order |
| Sample No. 60 | Mn:33 | Sn:67 | 730 | Mn$_2$Sn | MnSn$_2$ | 10° order | 10$^{-4}$ order |
| Sample No. 61 | Mo:50 | Ni:50 | 1750 | Mo | MoNi | 10° order | 10$^{-5}$ order |
| Sample No. 62 | Mo:75 | Si:25 | 2200 | Mo$_3$Si$_2$ | Mo$_3$Si | 10° order | 10$^{-4}$ order |
| Sample No. 63 | Mo:67 | Zr:33 | 2150 | Mo | ZrMo$_2$ | 10° order | 10$^{-5}$ order |
| Sample No. 64 | Ni:32 | Sb:68 | 1060 | NiSb | NiSb$_2$ | 10° order | 10$^{-5}$ order |
| Sample No. 65 | Ni:20.4 | Si:79.6 | 1250 | Si | NiSi$_2$ | 10° order | 10$^{-6}$ order |
| Sample No. 66 | Ni:43 | Sn:57 | 1160 | Ni$_3$Sn$_2$ | Ni$_3$Sn$_4$ | 10° order | 10$^{-5}$ order |
| Sample No. 67 | Pd:50 | Pb:50 | 680 | Pd$_3$Pb$_2$ | PdPb | 10° order | 10$^{-6}$ order |
| Sample No. 68 | Pr:67 | Tl:33 | 1100 | PrTl | Pr$_2$Tl | 10° order | 10$^{-5}$ order |
| Sample No. 69 | Tl:40 | Se:60 | 330 | TlSe | Tl$_2$Se$_3$ | 10° order | 10$^{-5}$ order |
| Sample No. 70 | Zr:33 | Si:67 | 570 | ZrSi | ZrSi$_2$ | 10° order | 10$^{-5}$ order |
| Sample No. 71 | Sn:83 | Sn:17 | 580 | SrSn$_3$ | SrSn$_5$ | 10° order | 10$^{-5}$ order |
| Sample No. 72 | Zr:33 | Sn:67 | 1570 | Zr$_3$Sn$_2$ | ZrSn$_2$ | 10° order | 10$^{-5}$ order |
| Sample No. 73 | Tl:50 | Te:50 | 370 | Tl$_3$Te$_2$ | TlTe | 10° order | 10$^{-5}$ order |

TABLE 2(B)

| | Composition of negative electrode materials | | Initial cycle | | | 50th cycle | | | Discharge capacity sustainable rate (%) |
|---|---|---|---|---|---|---|---|---|---|
| | Solid Phase (A) | Solid phase (B) | Charge capacity (mAh·cm$^{-3}$) | Discharge capacity (mAh·cm$^{-3}$) | Efficiency of charge & discharge (%) | Charge capacity (mAh·cm$^{-3}$) | Discharge capacity (mAh·cm$^{-3}$) | Efficiency of charge & discharge (%) | |
| Sample No. 9 | BaAl$_4$ | BaAl$_2$ | 1200 | 1100 | 92 | 1050 | 1000 | 95 | 91 |
| Sample No. 10 | CaAl$_2$ | CaAl$_4$ | 1180 | 1090 | 92 | 1043 | 998 | 96 | 92 |
| Sample No. 11 | CeAl$_2$ | CeAl$_4$ | 1225 | 1115 | 91 | 1085 | 1042 | 96 | 93 |
| Sample No. 12 | Co$_2$Al$_5$ | Co$_2$Al$_9$ | 1237 | 1126 | 91 | 1103 | 1059 | 96 | 94 |
| Sample No. 13 | CrAl$_3$ | CrAl$_4$ | 1234 | 1098 | 89 | 1040 | 998 | 96 | 91 |
| Sample No. 14 | Fe$_2$Al$_5$ | FeAl$_3$ | 1111 | 1020 | 92 | 992 | 945 | 95 | 93 |
| Sample No. 15 | Mn—Al s.s. | MnAl$_3$ | 1120 | 1010 | 90 | 1001 | 950 | 95 | 94 |
| Sample No. 16 | Ni$_2$Al$_3$ | NiAl$_3$ | 1170 | 1088 | 93 | 1045 | 1003 | 96 | 92 |
| Sample No. 17 | Pd$_2$Al$_3$ | PdAl$_3$ | 1163 | 1070 | 92 | 1027 | 996 | 97 | 93 |
| Sample No. 18 | Al$_2$Te$_3$ | Al$_5$Te | 1322 | 1150 | 87 | 1092 | 863 | 79 | 75 |
| Sample No. 19 | Al—Th s.s. | ThAl$_3$ | 1341 | 1220 | 91 | 1186 | 1150 | 97 | 94 |
| Sample No. 20 | Ti—Al s.s. | TiAl$_3$ | 1271 | 1100 | 87 | 1045 | 1001 | 96 | 91 |
| Sample No. 21 | V$_5$Al$_5$ | VAl$_3$ | 1310 | 1170 | 89 | 1099 | 1063 | 97 | 91 |
| Sample No. 22 | WAl$_5$ | WAl$_{12}$ | 1421 | 1250 | 88 | 1228 | 1167 | 95 | 93 |
| Sample No. 23 | Mg$_9$Ba | Mg$_4$Ba | 945 | 810 | 86 | 802 | 765 | 95 | 94 |
| Sample No. 24 | Ba$_2$Pb | BaPb | 1178 | 1060 | 90 | 1042 | 990 | 95 | 93 |
| Sample No. 25 | BaSn$_3$ | BaSn$_5$ | 1422 | 1280 | 90 | 1258 | 1195 | 95 | 93 |
| Sample No. 26 | BiCa$_3$ | Bi$_3$Ca | 1299 | 1143 | 88 | 1123 | 1067 | 95 | 93 |
| Sample No. 27 | BiCe | Bi$_2$Ce | 1582 | 1250 | 79 | 1210 | 1163 | 96 | 93 |
| Sample No. 28 | NiBi | NiBi$_3$ | 1420 | 1150 | 81 | 1138 | 1081 | 95 | 94 |
| Sample No. 29 | RhBi | RhBi$_2$ | 1465 | 1143 | 78 | 1107 | 1052 | 95 | 92 |
| Sample No. 30 | CaSi | Ca$_2$Si | 1150 | 1020 | 89 | 956 | 918 | 96 | 90 |
| Sample No. 31 | CaSi | CaSi$_2$ | 1210 | 1065 | 88 | 1020 | 970 | 95 | 91 |
| Sample No. 32 | Ca$_3$Tl$_4$ | CaTl$_3$ | 1326 | 1180 | 89 | 1145 | 1099 | 96 | 93 |
| Sample No. 33 | CaZn$_2$ | CaZn | 1310 | 1100 | 84 | 1108 | 150 | 95 | 95 |
| Sample No. 34 | Cu$_5$Cd$_8$ | CuCd$_3$ | 1375 | 1210 | 88 | 1148 | 1113 | 97 | 92 |
| Sample No. 35 | Mg$_3$Ce | Mg$_2$Ce | 709 | 610 | 86 | 577 | 554 | 96 | 91 |
| Sample No. 36 | CeZn$_9$ | CeZn$_{11}$ | 1469 | 1190 | 81 | 1165 | 1107 | 95 | 93 |
| Sample No. 37 | CoG$_6$ | Co$_2$Ge$_3$ | 1428 | 1157 | 81 | 1127 | 1082 | 96 | 94 |
| Sample No. 38 | CoSb | CoSb$_2$ | 1511 | 1250 | 83 | 1173 | 1138 | 97 | 91 |
| Sample No. 39 | CoSn | CoSn$_2$ | 1463 | 1212 | 83 | 1175 | 1139 | 97 | 94 |
| Sample No. 40 | CrSb | CrSb$_2$ | 1320 | 1050 | 80 | 1039 | 998 | 96 | 95 |
| Sample No. 41 | Sb—Cu s.s. | Cu$_2$Sb | 1290 | 1070 | 83 | 1014 | 974 | 96 | 91 |
| Sample No. 42 | Fe—Sb s.s. | FeSb$_2$ | 1390 | 1209 | 87 | 1184 | 1137 | 96 | 94 |
| Sample No. 43 | Ni$_2$Ga$_3$ | NiGa$_4$ | 1458 | 1123 | 77 | 1111 | 1056 | 95 | 94 |
| Sample No. 44 | PrGa$_2$ | PrGa | 1748 | 1311 | 75 | 1312 | 1246 | 95 | 95 |
| Sample No. 45 | Ga$_2$Te$_3$ | GaTe$_3$ | 1660 | 1295 | 78 | 1184 | 971 | 82 | 75 |
| Sample No. 46 | Mn$_5$Ge$_3$ | Mn$_3$Ge$_2$ | 1987 | 1351 | 68 | 1324 | 1271 | 96 | 94 |
| Sample No. 47 | Ni—Ge s.s. | NiGe | 1686 | 1366 | 81 | 1341 | 1301 | 97 | 95 |
| Sample No. 48 | Zr$_2$Ge | Zr$_3$Ge | 1701 | 1157 | 68 | 1133 | 1088 | 96 | 94 |
| Sample No. 49 | Mn—In s.s. | Mn$_3$In | 1397 | 1201 | 86 | 1159 | 1113 | 96 | 93 |
| Sample No. 50 | Ni—In s.s. | NiIn | 1296 | 1089 | 84 | 1075 | 1021 | 95 | 94 |
| Sample No. 51 | In$_2$Te$_3$ | In$_2$Te$_5$ | 1609 | 1223 | 76 | 1168 | 911 | 78 | 75 |
| Sample No. 52 | Mg$_3$La | MgLa | 923 | 714 | 77 | 684 | 650 | 95 | 91 |
| Sample No. 53 | LaSb | LaSb$_2$ | 1360 | 1156 | 85 | 1144 | 1098 | 96 | 95 |
| Sample No. 54 | LaZn$_8$ | LaZn$_{13}$ | 1172 | 1055 | 90 | 1044 | 992 | 95 | 94 |
| Sample No. 55 | MgNi$_2$ | Mg$_2$Ni | 726 | 610 | 84 | 578 | 561 | 97 | 92 |
| Sample No. 56 | Mg$_3$Pr | Mg$_9$Pr | 912 | 786 | 86 | 753 | 715 | 95 | 91 |
| Sample No. 57 | Mg$_2$Sr | Mg$_3$Sr | 827 | 727 | 88 | 689 | 662 | 96 | 91 |
| Sample No. 58 | MgZn$_2$ | MgZn | 1323 | 1115 | 84 | 1099 | 1055 | 96 | 95 |
| Sample No. 59 | Mn$_5$Si$_3$ | Mn$_3$Si | 1451 | 1277 | 88 | 1250 | 1213 | 97 | 95 |
| Sample No. 60 | Mn$_2$Sn | MnSn$_2$ | 1211 | 1050 | 87 | 1039 | 987 | 95 | 94 |
| Sample No. 61 | Mo | MoNi | 763 | 641 | 84 | 608 | 583 | 96 | 91 |
| Sample No. 62 | Mo$_3$Si$_2$ | Mo$_3$Si | 1425 | 1233 | 87 | 1211 | 981 | 81 | 80 |
| Sample No. 63 | Mo | ZrMo$_2$ | 94 | 699 | 88 | 681 | 667 | 98 | 95 |
| Sample No. 64 | NiSb | NiSb$_2$ | 1488 | 1255 | 84 | 1246 | 1196 | 96 | 95 |
| Sample No. 65 | Si | NiSi$_2$ | 1611 | 1450 | 90 | 1496 | 1421 | 95 | 98 |
| Sample No. 66 | Ni$_3$Sn$_2$ | Ni$_3$Sn$_4$ | 1588 | 1399 | 88 | 1355 | 1301 | 89 | 93 |
| Sample No. 67 | Pd$_3$Pb$_2$ | PdPb | 1509 | 1298 | 86 | 1223 | 1186 | 97 | 91 |
| Sample No. 68 | PrTl | Pr$_2$Tl | 1579 | 1405 | 89 | 1345 | 1278 | 95 | 91 |
| Sample No. 69 | TlSe | Tl$_2$Se$_3$ | 1356 | 1167 | 86 | 1124 | 888 | 79 | 76 |
| Sample No. 70 | ZrSi | ZrSi$_2$ | 1795 | 1401 | 78 | 1357 | 1289 | 95 | 92 |
| Sample No. 71 | SrSn$_3$ | SrSn$_5$ | 1609 | 1384 | 86 | 1311 | 1259 | 96 | 91 |
| Sample No. 72 | Zr$_3$Sn$_2$ | ZrSn$_2$ | 1421 | 1114 | 78 | 1084 | 1051 | 97 | 94 |
| Sample No. 73 | Tl$_3$Te$_2$ | TlTe | 1633 | 1321 | 81 | 1342 | 1074 | 80 | 81 |

TABLE 3

| Sample No. | Raw Materials mixing ratio (at. %) Si | Raw Materials mixing ratio (at. %) Ni | Heating temperature (C. °) | Solid phase B percentage content (wt. %) | Average Particle size ($\mu$m) | Specific surface area ($m^2 \cdot g^{-1}$) | Initial cycle *A | Initial cycle *B | Initial cycle *C | 50th cycle *A | 50th cycle *B | 50th cycle *C | 50th cycle *D |
|---|---|---|---|---|---|---|---|---|---|---|---|---|---|
| 74a | 92 | 8 | 1450 | 30 | 100 | 0.0019 | 2581 | 2211 | 86 | 679 | 611 | 90 | 28 |
| 74b | | | | | 50 | 0.0051 | 2515 | 2295 | 91 | 651 | 556 | 95 | 24 |
| 74c | | | | | 40 | 0.012 | 3005 | 2456 | 82 | 866 | 778 | 90 | 32 |
| 74d | | | | | 20 | 3 | 2958 | 2355 | 80 | 901 | 821 | 91 | 35 |
| 74e | | | | | 1 | 8 | 2922 | 2314 | 79 | 870 | 699 | 80 | 30 |
| 74f | | | | | 0.5 | 62 | 2899 | 2324 | 80 | 859 | 701 | 82 | 30 |
| 75a | 89 | 11 | 1400 | 40 | 100 | 0.0022 | 2188 | 1977 | 90 | 2039 | 1937 | 95 | 98 |
| 75b | | | | | 50 | 0.0055 | 2222 | 1983 | 89 | 2004 | 1924 | 96 | 99 |
| 75c | | | | | 40 | 0.01 | 2444 | 2224 | 91 | 2267 | 2154 | 95 | 98 |
| 75d | | | | | 20 | 5 | 2412 | 2195 | 91 | 2235 | 2123 | 95 | 98 |
| 75e | | | | | 1 | 10 | 2405 | 2213 | 92 | 2224 | 2135 | 96 | 98 |
| 75f | | | | | 0.5 | 45 | 2399 | 2210 | 92 | 2222 | 2111 | 95 | 98 |
| 76a | 82.5 | 17.5 | 1350 | 60 | 100 | 0.0015 | 1711 | 1601 | 94 | 1635 | 1552 | 95 | 97 |
| 76b | | | | | 50 | 0.0059 | 1682 | 1572 | 94 | 1688 | 1621 | 96 | 97 |
| 76c | | | | | 40 | 0.011 | 1903 | 1792 | 94 | 1829 | 1756 | 96 | 98 |
| 76d | | | | | 20 | 5.1 | 1889 | 1755 | 93 | 1810 | 1720 | 95 | 98 |
| 76e | | | | | 1 | 9.9 | 1872 | 1768 | 94 | 1824 | 1733 | 95 | 98 |
| 76f | | | | | 0.5 | 47 | 1905 | 1810 | 95 | 1848 | 1774 | 96 | 98 |
| 77a | 69 | 31 | 1200 | 95 | 100 | 0.0025 | 1623 | 1411 | 87 | 1441 | 1383 | 96 | 98 |
| 77b | | | | | 50 | 0.0052 | 1611 | 1421 | 88 | 1451 | 1378 | 95 | 97 |
| 77c | | | | | 40 | 0.01 | 1798 | 1594 | 89 | 1627 | 1562 | 96 | 98 |
| 77d | | | | | 20 | 4 | 1841 | 1633 | 89 | 1684 | 1600 | 95 | 98 |
| 77e | | | | | 1 | 10 | 1839 | 1629 | 89 | 1680 | 1596 | 95 | 98 |
| 77f | | | | | 0.5 | 47 | 1829 | 1615 | 88 | 1666 | 1583 | 95 | 98 |
| 78a | 68 | 32 | 1200 | 97 | 100 | 0.0017 | 1212 | 915 | 75 | 944 | 897 | 95 | 98 |
| 78b | | | | | 50 | 0.0049 | 1129 | 992 | 87 | 1002 | 962 | 96 | 97 |
| 78c | | | | | 40 | 0.012 | 1348 | 1201 | 89 | 1239 | 1176 | 95 | 98 |
| 78d | | | | | 20 | 5.7 | 1355 | 1182 | 87 | 1219 | 1158 | 95 | 98 |
| 78e | | | | | 1 | 9.8 | 1385 | 1175 | 85 | 1212 | 1156 | 95 | 98 |
| 78f | | | | | 0.5 | 47 | 1392 | 1169 | 84 | 1193 | 1146 | 96 | 98 |

*A: Charge capacity (mAh · cm$^{-3}$)
*B: Discharge capacity (mAh · cm$^{-3}$)
*C: Efficiency of charge & discharge (%)
*D: Discharge capacity Sustainable rate (%)

TABLE 4

| | Negative electrode material composition | Average particle size ($\mu$m) | Specific surface area ($m^2 \cdot g^{-1}$) | Initial cycle *A | Initial cycle *B | Initial cycle *C | 50th cycle *A | 50th cycle *B | 50th cycle *C | 50th cycle *D |
|---|---|---|---|---|---|---|---|---|---|---|
| Conventional case 1a | Si | 100 | 0.0025 | 4811 | 680 | 14 | 24 | 3 | 13 | 0 |
| Conventional case 1b | | 50 | 0.0054 | 4798 | 650 | 14 | 15 | 2 | 13 | 0 |
| Conventional case 1c | | 40 | 0.01 | 5522 | 811 | 15 | 11 | 1 | 9 | 0 |
| Conventional case 1d | | 20 | 5 | 5318 | 823 | 16 | 14 | 1 | 7 | 0 |
| Conventional case 1e | | 1 | 10.1 | 5415 | 844 | 16 | 17 | 4 | 24 | 0 |
| Conventional case 1f | | 0.5 | 47 | 5311 | 850 | 16 | 14 | 5 | 36 | 0 |
| Conventional case 2a | Si + C | 100 | 0.0031 | 1691 | 475 | 28 | 88 | 14 | 16 | 3 |
| Conventional case 2b | | 50 | 0.0054 | 1711 | 451 | 26 | 91 | 15 | 17 | 3 |
| Conventional case 2c | | 40 | 0.011 | 2255 | 601 | 27 | 110 | 21 | 19 | 3 |
| Conventional case 2d | | 20 | 7 | 2169 | 559 | 26 | 115 | 25 | 22 | 4 |
| Conventional case 2e | | 1 | 10 | 2214 | 584 | 26 | 121 | 38 | 31 | 7 |
| Conventional case 2f | | 0.5 | 49 | 2267 | 599 | 26 | 109 | 34 | 31 | 6 |
| Conventional case 3a | C (Natural | 100 | 0.0021 | 491 | 447 | 91 | 445 | 443 | 100 | 99 |

TABLE 4-continued

| Negative electrode material composition | Average particle size ($\mu$m) | Specific surface area ($m^2 \cdot g^{-1}$) | Initial cycle *A | *B | *C | 50th cycle *A | *B | *C | *D |
|---|---|---|---|---|---|---|---|---|---|
| Conventional case 3b (Graphite) | 50 | 0.0052 | 484 | 451 | 93 | 447 | 446 | 100 | 99 |
| Conventional case 3c | 40 | 0.001 | 490 | 440 | 90 | 438 | 436 | 100 | 99 |
| Conventional case 3d | 20 | 4 | 488 | 448 | 92 | 445 | 444 | 100 | 99 |
| Conventional case 3e | 1 | 10 | 491 | 450 | 92 | 447 | 446 | 100 | 99 |
| Conventional case 3f | 0.5 | 51 | 490 | 449 | 92 | 446 | 445 | 100 | 99 |
| Conventional case 4a $Mg_2Si$ | 100 | 0.0029 | 1159 | 465 | 40 | 452 | 451 | 100 | 97 |
| Conventional case 4b | 50 | 0.0054 | 1139 | 459 | 40 | 447 | 445 | 100 | 97 |
| Conventional case 4c | 40 | 0.011 | 1140 | 461 | 40 | 448 | 447 | 100 | 97 |
| Conventional case 4d | 20 | 9 | 1121 | 470 | 42 | 463 | 461 | 100 | 98 |
| Conventional case 4e | 1 | 10 | 1149 | 455 | 40 | 444 | 441 | 100 | 97 |
| Conventional case 4f | 0.5 | 49 | 1155 | 459 | 40 | 451 | 450 | 100 | 98 |

*A: Capacity charge (mAh $\cdot$ cm$^{-3}$)
*B: Discharge capacity (mAh $\cdot$ cm$^{-3}$)
*C: Efficiency of charge and discharge (%)
*D: Discharge capacity sustainable rate (%)

TABLE 5

| | | Discharge capacity change rate (%) | | | |
|---|---|---|---|---|---|
| Sample No. | Si exposed area ratio (%) | 0.7 mA.cm$^{-2}$ | 1.4 mA.cm$^{-2}$ | 2.0 mA.cm$^{-2}$ | 3.0 mA.cm$^{-2}$ |
| 79a | 0 | 80 | 73 | 51 | 44 |
| 79b | 2 | 100 | 93 | 87 | 75 |
| 79c | 5 | 100 | 95 | 91 | 86 |
| 79d | 10 | 100 | 96 | 92 | 88 |
| 79e | 20 | 100 | 96 | 93 | 89 |
| 79f | 40 | 100 | 96 | 95 | 90 |
| 79g | 60 | 100 | 97 | 94 | 89 |
| 79h | 80 | 100 | 96 | 95 | 90 |
| 79i | 100 | 100 | 97 | 95 | 91 |

TABLE 6

| Positive electrode material | Negative electrode paste composition (weight %) Negative electrode material | PVDF | Natural Graphite | Discharge capacity sustainable rate (%) |
|---|---|---|---|---|
| $LiCoO_2$ | 92 | 5 | 3 | 63 |
| | 90 | 5 | 5 | 80 |
| | 65 | 5 | 30 | 85 |
| | 45 | 5 | 50 | 83 |
| | 15 | 5 | 80 | 80 |
| | 10 | 5 | 85 | 75 |
| $LiNiO_2$ | 92 | 5 | 3 | 62 |
| | 90 | 5 | 5 | 81 |
| | 65 | 5 | 30 | 84 |
| | 45 | 5 | 50 | 83 |
| | 15 | 5 | 80 | 82 |
| | 10 | 5 | 85 | 70 |
| $LiMn_2O_4$ | 92 | 5 | 3 | 62 |
| | 90 | 5 | 5 | 81 |
| | 65 | 5 | 30 | 84 |
| | 45 | 5 | 50 | 83 |
| | 15 | 5 | 80 | 82 |
| | 10 | 5 | 85 | 70 |

What is claimed is:

1. A negative electrode material for a non-aqueous electrolyte secondary battery comprising:

a composite particle comprising;

a core formed by a solid phase A, and a solid phase B wrapping, at least partially, said core formed by solid phase A, wherein said solid phase A comprises one of the following materials:

at least one element being able to alloy with lithium, a solid solution including said element being able to alloy with lithium, and an intermetallic compound including said element being able to alloy with lithium, wherein said solid phase B has a different component from the solid phase A and comprising one of the following materials:

a second solid solution including said element being able to alloy with lithium, and a second intermetallic compound including said element being able to alloy with lithium, wherein both of said solid phase A and said solid phase B are free of elemental lithium.

2. The negative electrode material for a non-aqueous electrolyte secondary battery as defined in claim 1, wherein said composite particle is solidified and deposited by peritectic phenomenon.

3. The negative electrode material for non-aqueous electrolyte secondary battery as defined in claim 1, wherein said solid phase B is a mixed conductor having electronic conductivity and lithium ionic conductivity.

4. The negative electrode material for non-aqueous electrolyte secondary battery as defined in claim 1, wherein said solid phase A comprises
at least one of the elements being able to alloy with lithium including, zinc, cadmium, aluminum, gallium, indium, thallium, silicon, germanium, tin, lead, antimony and bismuth.

5. The negative electrode material for non-aqueous electrolyte secondary battery as defined in claim 1, wherein said solid phase B comprises one of the following materials:
the second solid solution including at least one element selected from
alkaline earth element and transition metal element, and
an intermetallic element including at least one element selected from alkaline earth element and transition metal element.

6. The negative electrode material for non-aqueous electrolyte secondary battery as defined in claim 1, wherein said solid phase A comprises silicon, and said solid phase B comprises nickel silicides.

7. The negative electrode material for non-aqueous electrolyte secondary battery as defined in claim 1, wherein a percentage content of the solid phase B in said composite particle ranges between 40 and 95 weight %.

8. The negative electrode material for non-aqueous electrolyte secondary battery as defined in claim 6, wherein said composite particle has the following dimensions:
average particle size: 1–40 $\mu$m
specific surface area: 0.01–10 $m^2 \cdot g^{-1}$.

9. The negative electrode material for non-aqueous electrolyte secondary battery as defined in claim 7, wherein said composite particle has the following dimensions:
average particle size: 1–40 $\mu$m
specific surface area: 0.01–10 $m^2 \cdot g^{-1}$.

10. The negative electrode material for a non-aqueous electrolyte secondary battery as defined in claim 6, wherein said solid phase A has a particle surface, and wherein said solid phase A exposes on said particle surface 5–40% of an overall surface area of the particle.

11. The negative electrode material for a non-aqueous electrolyte secondary battery as defined in claim 1, wherein a volumetric expansion during insertion of lithium in said solid phase B is smaller than that of said solid phase A.

12. The negative electrode material for a non-aqueous electrolyte secondary battery comprise as defined in claim 1, wherein the expansion and shrink in solid phase A during charging and discharging is suppressed by covering the surface of said solid phase A partly or fully with said solid phase B whose volumetric expansion and shrink during insertion and extraction of lithium is smaller than that of said solid phase A.

13. A non-aqueous electrolyte secondary battery comprising a positive electrode, a negative electrode and non-aqueous electrolyte, wherein
said negative electrode comprises a negative electrode material comprising:
a composite particle comprising:
a core formed by a solid phase A, and
a solid phase B wrapping, at least partially, said core formed by solid phase A,
wherein said solid phase A comprises one of the following material:
at least one element being able to alloy with lithium,
a solid solution including said element being able to alloy with lithium, and
an intermetallic compound including said element being able to alloy with lithium,
wherein said solid phase B has a different component from the solid phase A and comprising one of the following materials:
a second intermetallic compound including said element being able to alloy with lithium, wherein both of said solid phase A and said solid phase B are free of elemental lithium.

14. A non-aqueous electrolyte secondary battery as defined in claim 13, wherein said composite particle is solidified and deposited by peritectic phenomenon.

15. A non-aqueous electrolyte secondary battery as defined in claim 13, wherein said solid phase B is a mixed conductor having electronic conductivity and lithium ionic conductivity.

16. A non-aqueous electrolyte secondary battery as defined in claim 13, wherein said solid phase A comprises one of the following materials:
at least one of elements being able to alloy with lithium including, zinc, cadmium, aluminum, gallium, indium, thallium, silicon, germanium, tin, lead, antimony and bismuth,
a solid solution including said element being able to alloy with lithium,
an intermetallic compound including said element being able to alloy with lithium.

17. A non-aqueous electrolyte secondary battery as defined in claim 13, wherein said solid phase B comprises one of the following materials:
a solid solution including at least one element selected from alkaline earth element and transition metal element, and an intermetallic element including at least one element selected from alkaline earth element and transition metal element.

18. A non-aqueous electrolyte secondary battery as defined in claim 13, wherein said solid phase A comprises silicon, and said solid phase B comprises nickel silicides.

19. A non-aqueous electrolyte secondary battery as defined in claim 13, wherein a percentage content of the solid phase B in said composite particle ranges between 40 and 95 weight %.

20. A non-aqueous electrolyte secondary battery as defined in claim 18, wherein said composite particle has the following dimensions:
average particle size: 1–40 $\mu$m,
specific surface area: 0.01–10 $m^2 \cdot g^{-1}$.

21. A non-aqueous electrolyte secondary battery as defined in claim 19, wherein said composite particle has the following dimensions:
average particle size: 1–40 $\mu$m,
specific surface area: 0.01–10 $m^2 \cdot g^{-1}$.

22. A non-aqueous electrolyte secondary battery as defined in claim 18, wherein said solid phase A exposes on the particle surface 5–40% of an overall surface area of the particle.

23. A non-aqueous electrolyte secondary battery as defined in claim 13, wherein carbon powder is added to said material of the negative electrode within a range of 5 to 80 weight %.

24. A non-aqueous electrolyte secondary battery as defined in claim 14, wherein carbon powder is added to said material of the negative electrode within a range of 5 to 80 weight %.

25. A non-aqueous electrolyte secondary battery as defined in claim 15, wherein carbon powder is added to said material of the negative electrode within a range of 5 to 80 weight %.

26. A non-aqueous electrolyte secondary battery as defined in claim 16, wherein carbon powder is added to said material of the negative electrode within a range of 5 to 80 weight %.

27. A non-aqueous electrolyte secondary battery as defined in claim 17, wherein carbon powder is added to said material of the negative electrode within a range of 5 to 80 weight %.

28. A non-aqueous electrolyte secondary battery as defined in claim 18, wherein carbon powder is added to said material of the negative electrode within a range of 5 to 80 weight %.

29. A non-aqueous electrolyte secondary battery as defined in claim 19, wherein carbon powder is added to said material of the negative electrode within a range of 5 to 80 weight %.

30. A non-aqueous electrolyte secondary battery as defined in claim 20, wherein carbon powder is added to said material of the negative electrode within a range of 5 to 80 weight %.

31. A non-aqueous electrolyte secondary battery as defined in claim 21, wherein carbon powder is added to said material of the negative electrode within a range of 5 to 80 weight %.

32. A non-aqueous electrolyte secondary battery as defined in claim 22, wherein carbon powder is added to said material of the negative electrode within a range of 5 to 80 weight %.

33. The non-aqueous electrolyte secondary battery as defined in claim 13, wherein a volumetric expansion during insertion of lithium in said solid phase B is smaller than that of said solid phase A.

34. The non-aqueous electrolyte secondary battery as defined in claim 13, wherein the expansion and shrink in solid phase A during charging and discharging is suppressed by covering the surface of said solid phase A partly or fully with said solid phase B whose volumetric expansion and shrink during insertion and extraction of lithium is smaller than that of said solid phase A.

35. A negative electrode material for a battery, comprising:

a silicon core which is free of elemental lithium; and a layer of $NiSi_2$ which is free of elemental lithium at least partially wrapped around said core.

36. A negative electrode material for a battery according to claim 35, wherein said silicon core is a solid solution.

37. A negative electrode material for a battery according to claim 35, wherein said layer is an intermetallic compound.

38. A negative electrode for a battery, comprising:

a core including a first material selected from the group consisting of an element which alloys with Li; and a layer at least partially around said core, wherein said core and said layer are free of elemental lithium.

39. A negative electrode for a battery according to claim 38, further comprising a second material which includes said first material wherein said first material differs from said second material.

* * * * *

UNITED STATES PATENT AND TRADE MARK OFFICE
CERTIFICATE OF CORRECTION

PATENT NO. : 6,090,505
DATED : July 18, 2000
INVENTOR(S) : Shimamura et al.

It is certified that error appears in the above-identified patent and that said Letters Patent is hereby corrected as shown below:

Cover page, item [56] References Cited, U.S. Patent Documents, delete "4,495,358" and insert --4,495,258--.

Signed and Sealed this

First Day of May, 2001

Attest:

NICHOLAS P. GODICI

Attesting Officer     Acting Director of the United States Patent and Trademark Office